United States Patent [19]

Howells et al.

[11] 4,037,095

[45] July 19, 1977

[54] SIGNAL STABILIZING CIRCUITS

[75] Inventors: Edward Morris Howells, Abernethy; Cheung Yun Chan, Mount Hutton, both of Australia

[73] Assignee: The Broken Hill Proprietary Company Limited, Melbourne, Australia

[21] Appl. No.: 614,157

[22] Filed: Sept. 17, 1975

[30] Foreign Application Priority Data

Sept. 18, 1974 Australia .............................. 8949/74

[51] Int. Cl.² .......................... G06G 7/18; H03K 5/00
[52] U.S. Cl. ...................................... 235/183; 328/165
[58] Field of Search .................... 235/183, 151.33, 152; 325/42, 65, 323; 328/162, 165, 167; 333/19; 177/1

[56] References Cited

U.S. PATENT DOCUMENTS

| | | | |
|---|---|---|---|
| 3,192,535 | 6/1965 | Watson | 235/183 UX |
| 3,307,019 | 2/1967 | Woodard et al. | 235/183 |
| 3,334,305 | 8/1967 | Chu-Sun Yen | 328/151 |
| 3,446,299 | 5/1969 | Leonowicz | 235/183 |
| 3,693,100 | 9/1972 | Brown et al. | 328/165 |
| 3,771,167 | 11/1973 | Ross | 235/151.31 |
| 3,829,780 | 8/1974 | White | 325/42 |
| 3,912,029 | 10/1975 | Gorman et a. | 328/165 |
| 3,937,943 | 2/1976 | Debrunner et al. | 235/183 |

Primary Examiner—Charles E. Atkinson
Attorney, Agent, or Firm—Cushman, Darby & Cushman

[57] ABSTRACT

This specification discloses signal processing circuits of the type suitable for use in removing unwanted cyclic and/or random components from a d.c. signal such as signals of the type produced by load transducers in weighing systems. In the preferred forms, the processing circuit comprises means for determining the period of oscillation of the composite signal, means for integrating the composite signal over one period of the composite signal, and means for dividing the integrated composite signal by the period thereof to produce the average of the composite signal over one period. Several forms of circuit including such means are disclosed including one comprising a low pass filter interposed between the signal source and the phase locked loop, a voltage to frequency converter connected to the output of the filter and having its output connected to a digital integrator circuit controlled by the phase locked loop to integrate the signal over one period, a digital divider circuit connected to the output of the integrator and a time-base integrator connected to the divider and controlled by the phase locked loop to divide the integrator output by the period of the signal to produce a digital average signal, and a digital to analogue converter for converting the digital average signal to analogue form.

9 Claims, 9 Drawing Figures

SIGNAL STABILIZING CIRCUITS

This invention relates to electronic signal processing circuits for removing from the d.c. output of an electrical transducer cyclic and random noise to restore the transducer output to its desired d.c. signal.

Transducers used for measuring physical phenomena, such as weight, usually produce an output which is a d.c. voltage proportional to the parameter monitored. In general this signal will comprise the following components:
1. the steady d.c. signal proportional to the measured variable (hereinafter referred to as $E_{dc}$);
2. superimposed alternating components, e.g. vibrations, oscillations, mains pick-up etc. (hereinafter referred to as $E_{ac}$);
3. random noise.

Since it is only the d.c. signal that is representative of the variable being measured the cyclic and random noise components serve to reduce the accuracy of the transducer. Therefore the problem to be solved is how to eliminate or substantially reduce all unwanted components.

The presence of cyclic and random noise components in the electrical signal derived from the load cells of a steel teeming ladle crane weighing system is a particular problem and has preventing full advantage being taken of the teeming to weight method of ingot production. The unwanted components are produced by a number of sources including:
1. Vibration of the mass hanging on the rope which is a three dimensional harmonic motion.
2. The vibration of the beam of the crane, this is also a three dimensional harmonic motion.
3. The vibration of the whole building structure. This is a random vibration, largely depending on the motion of other nearby moving objects and the relative location of the crane.
4. The sudden change of flow rate during teeming due to the application of the stopper.

The high frequency components can normally be easily filtered out using conventional low pass filters. The problem with this method is the inherent time delay for the d.c. component to reach its steady value. This delay would usually be several times the period of the lowest frequency removed. In most mechanical weighing systems for example, the offending oscillation frequency is low, say about 0.1 Hz to 10 Hz, and in one known system the minimum delay is reported to be 1 sec. Such a delay will obviously produce overpour problems in the teeming to weight method.

An alternative method commonly used is the band reject filter ("notch" filter). This approach reduces the loss of system response but is difficult to maintain frequency alignment due to changes in offending frequency of, say the mechanical system and the resonant frequency of the notch filter.

The only known method of accurately and rapidly eliminating unwanted components is by subjecting the signal to Fourrier analysis or other digital techniques in a computer. However, this method is both expensive and complex.

The object of this invention is to provide a signal processing circuit which for all practical purposes removes the unwanted cyclic and/or random components from a transducer signal.

In its broadest aspect the invention provides a signal processing circuit for removing unwanted cyclic components from a composite d.c./cyclic signal comprising means for determining the period of the composite signal, and means for averaging the composite signal over the period of said signal to remove the cyclic components.

More specifically, the invention provides a signal processing circuit for removing unwanted cyclic and/or random components from a composite d.c./cyclic signal, comprising means for determining the period of oscillation of the composite signal, means for integrating the composite signal over one period of the composite signal, and means for dividing the integrated composite signal by the period thereof to produce the average of the composite signal over one period.

Preferably the means for determining the period of the signal comprises a phase locked loop which accurately reproduces the frequency of the composite signal enabling stable determination of the period.

The above preferred method of restoring the d.c. signal is more efficient than conventional methods such as the comparator or "zero-crossing" methods.

One particularly preferred form of the invention and several alternative forms will now be described with reference to the accompanying drawings in which.

In investigating the problem of removing unwanted cyclic/random signals from the d.c. output of crane weighing load cells, a careful analysis of the unwanted component of the output revealed that it was a random harmonic oscillating signal with a mean value equal to zero. On the basis of this discovery it was determined that the unwanted component could be removed by performing an averaging operation on the output signal. The averaging operation is most conveniently performed by integrating the signal over one oscillatory noise cycle followed by division by the period of the cycle.

In order to perform this operation it is necessary to determine accurately the period of oscillation of the oscillatory noise signal. Unfortunately, this period is not a constant but is continuously and randomly varying. The range of variation is, for example, from 3 to 5 Hz in the case of crane weighing load cells. Therefore, a means is required to determine dynamically the period of oscillation in order to control the integration operation and thus provide the dividend for the division operation. Threshold detection techniques such as the zero crossing detection cannot be used because other random noises in the load cell signal will cause faulty detection of the threshold level. However, it was found that necessary function could be performed by a phase locked loop frequency modulated discriminator.

As most readers of this specification will be aware, the phase locked loop is a servo system capable of accurately reproducing the frequency of the signal to be processed. The frequency tracking capability of the loop allows the stable determination of the frequency of the composite signal presented thereto and thus the period of the signal.

In view of the well-known nature of the phase locked loop discriminator, further description of its circuitry or operation is not required. Suffice it to say that the output of the discriminator is a square wave reproduction of the frequency of the cyclic noise signal.

Figure 1:
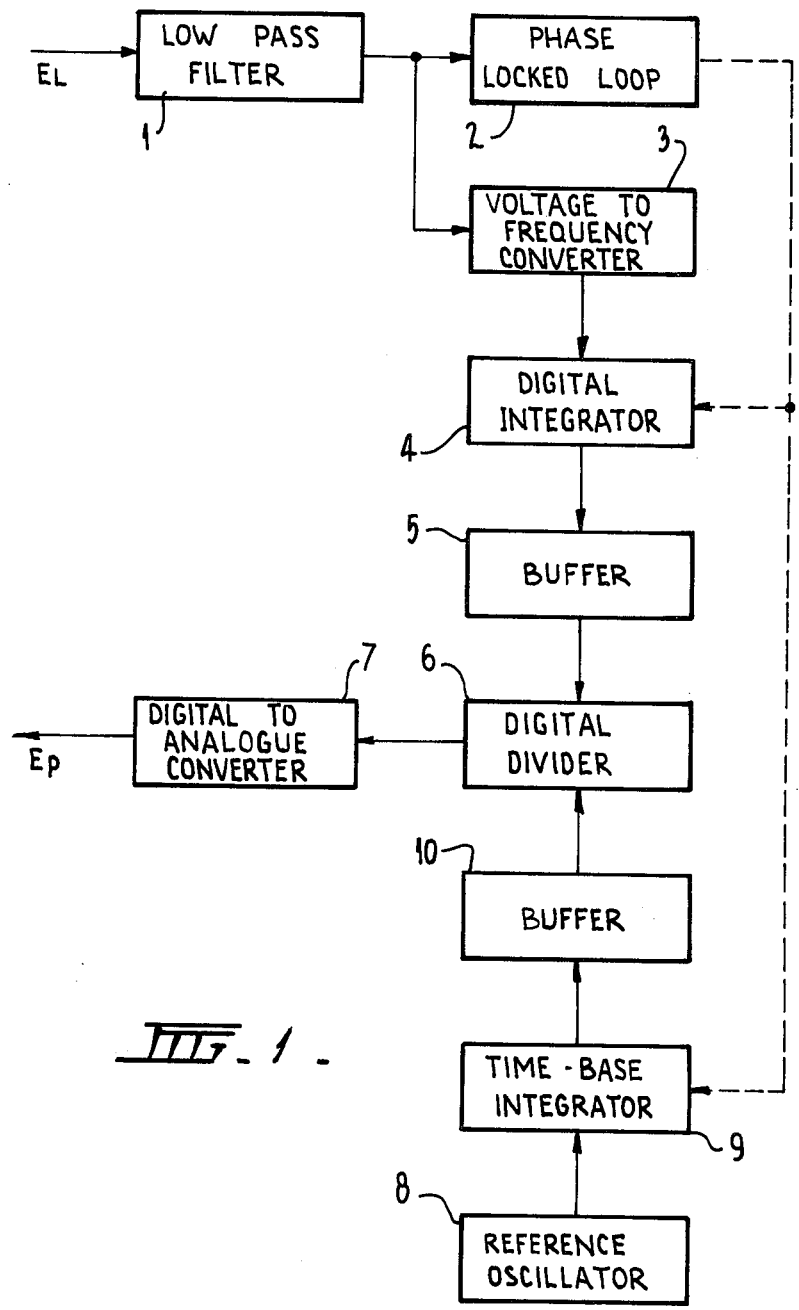
FIG. 1 is a block diagram of the particularly preferred form of the invention.
Figure 2:
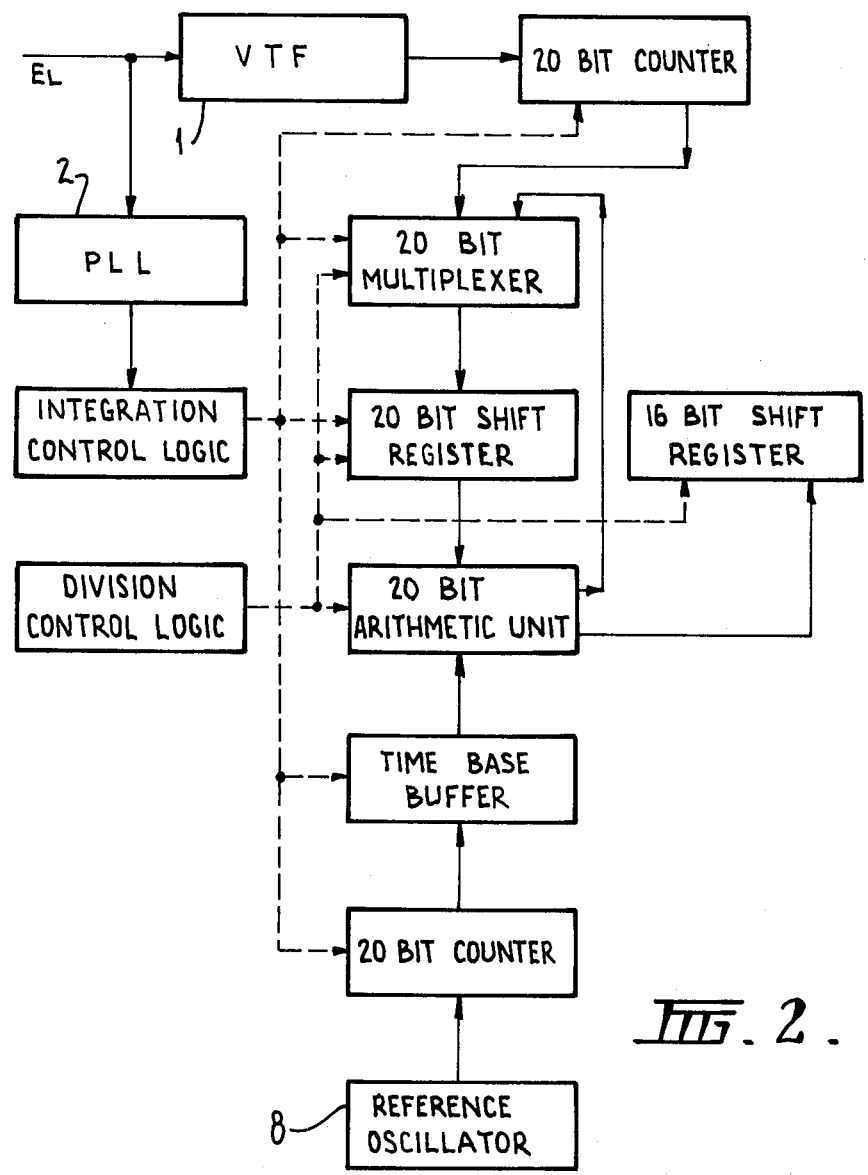
FIG. 2 is a more detailed block diagram illustrating the data processing circuitry used in the circuit of Fig. 1.

Referring now to Fig. 1 of the drawings, it will be seen that the signal processing circuit includes a low pass filter 1 having its output connected to an integrated circuit phase locked loop discriminator 2 (such as a type 565) and to a voltage to frequency converter 3. The output of converter 3 is in turn connected to a digital integrator 4 of known construction as shown in Fig. 2. The integrator output is connected via a buffer 5 to a digital divider 6 once again of known construction shown in more detail in Fig. 2. The divider 6 output is connected to a digital to analogue converter 7 and also receives the output of a reference oscillator 8 driven time-base integrator 9 through a buffer 10.

Figure 3:
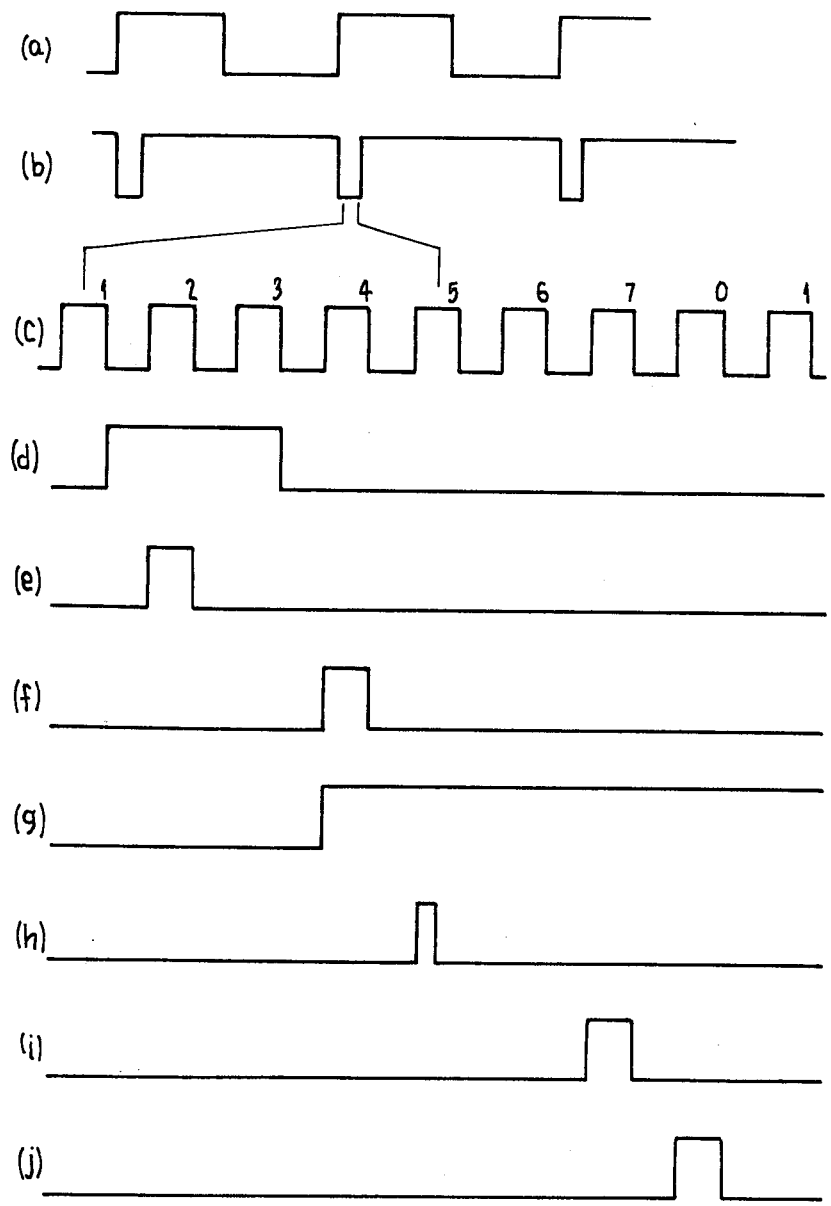
FIG. 3 illustrates the control timing for the integration and division process performed by the processing circuitry of FIG. 2.

The construction and operation of this circuit will be apparent to skilled readers from the following description which should be read in conjunction with Figs. 1 to 3 inclusive. The load signal $E_L$ from the transducer is first passed through the low pass filter 1 which removes all the high frequency noises such as spikes and 50 Hz interference. The cut-off frequency of the filter is set such that the time delay introduced is negligable. The voltage to frequency converter 3 and the digital integrator 4 integrate the output from the filter 1 while the period of integration is determined by the phase locked loop 2 which continuously monitors the output from the filter 1. At the same time the phase locked loop 2 controls the time-base integrator 9 so that it measures the duration of the period. After each cycle, the contents of the digital integrator 4 and time-base integrator 9 are sampled and fast digital division performed on the integral and time-base by the divider 6 to produce the average value of the sampled cycle. Immediately after each sampling another integration cycle is performed so that the integration and division times overlap thereby achieving maximum utilisation of the information from the transducer. The digital signal output from the divider 6 is converted by the converter 7 to an analogue output representing the processed load signal $E_p$.

The details shown in Fig. 2 will be self-explanatory to skilled readers. The control timing functions shown in Fig. 3 are as follows:

a. is the phase locked loop output
b. is the integration period
c. are the reference oscillator pulses
d. is the open multiplexer command
e. is the transfer data to buffers command
f. is the reset integrating counters command
g. is the initiate division command
h. is the reset sequence generator command
i. is the command: "if no arithmetic underflow, update shift register".
j. is the shift left command.

Division is accomplished by sixteen shift left subtraction sequences and appropriate actions for data handling between subtractions.

Figure 4:
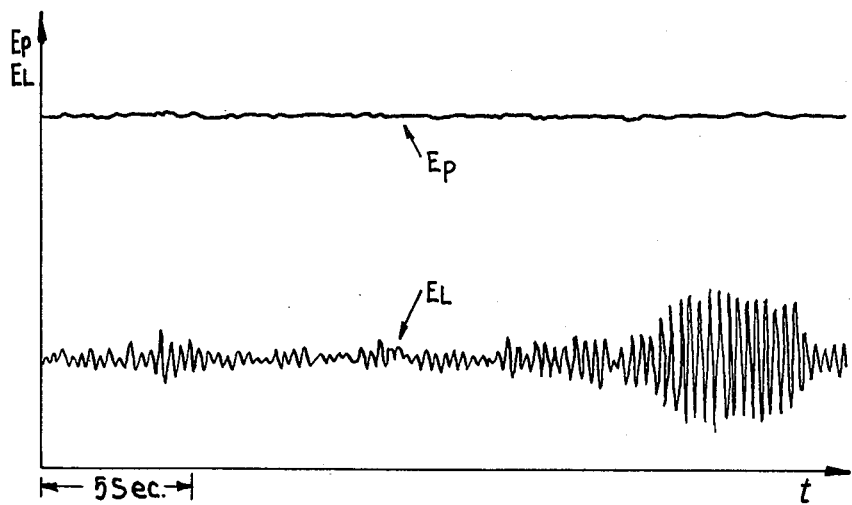
FIGS. 4 and 5 are graphs showing load cell signals and the analogue output signals produced by the circuit of Fig. 1 before and during the teeming operations respectively.
Figure 5:
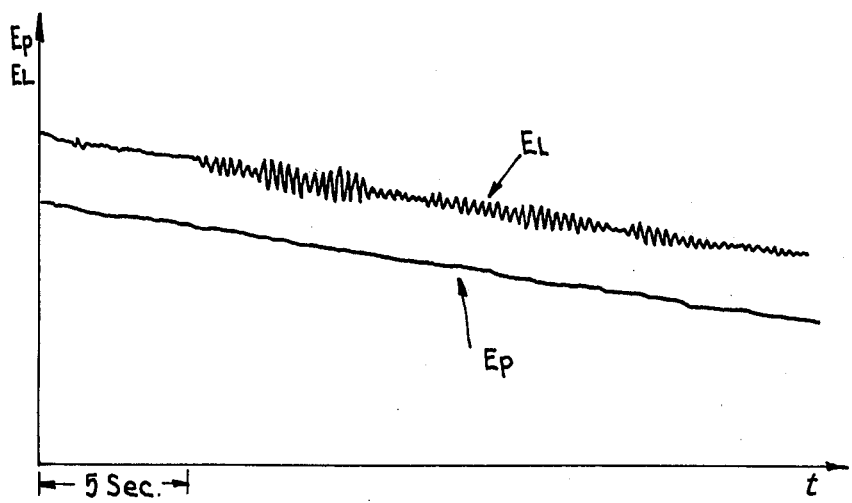

The processing circuitry has been successfully tested in practice and Figs. 4 and 5 show results obtained both before and during teeming of an ingot. The worst signal time lag experienced by the system is of the order of 0.17 sec. which represents a substantial improvement over known filter systems. Similarly by using the 20 bit system shown in Fig. 2, the accuracy of the digital computation is ±1 p.p.m.

Figure 6:
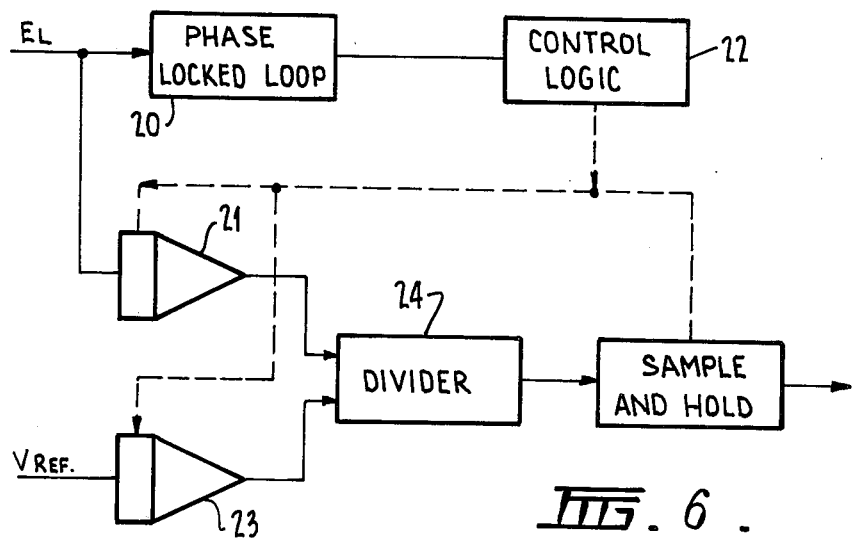
FIGS. 6, 7, 8 and 9 show alternative forms of the invention.

The alternative signal processing circuit shown in FIG. 6 is an analogue integration circuit. In this circuit the composite signal $E_L$ is applied to a phase locked loop 20 which produces an output representative of the period of signal $E_L$. Simultaneously signal $E_L$ is applied to an integrator 21 which is operative only on receiving a control signal 2 from a control logic 22. Control logic 22 produces a control signal of duration corresponding to the period of $E_L$ which is applied simultaneously to operate integrator 22 as well as a further integrator 23. The integrator 21 integrates the composite signal $E_L$ over the period, whilst integrator 23 integrates a reference voltage ($V_{Ref}$) over the same period. The outputs from integrators 21 and 23 respectively are fed to a divider 24 which divides the two output voltages and produces an output representative of the average value of signal $E_L$.

Figure 7:
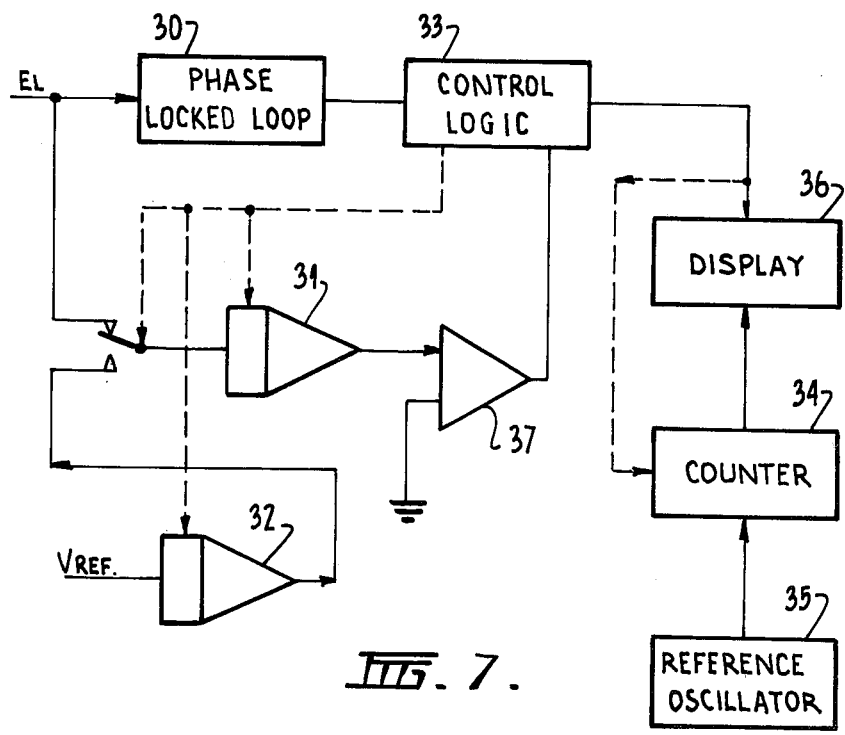

The circuit shown in Fig. 7 integrates the signal $E_L$ by the dual slope integrator method which is similar to the digital method except that here the integration period is variable and is determined by the phase locked loop 30. The control logic 33 starts the integrators 31 and 32 at the beginning of the period of $E_L$, $T_1$, and stops them at the end of the period as determined by the phase locked loop 30. The output of integrator 31 is thus:

$$E_1 = \int_o^{T_1} E_L \cdot dt = \int_o^{T_1} E_{dc} \cdot dt + \int_o^{T_1} E_{ac} \cdot \sin 2\pi F_1 t \cdot dt$$
$$= E_{dc} \cdot T_1 + o$$

The output of integrator 32 in this time is:

$$E_2 = - \int_o^{T_1} V_{Ref} \cdot dt = -T_1 \cdot V_{Ref}$$

The control logic 33 then throws the switch to run the output of integrator 32 to zero as detected by the comparator 34 in time $T_2$. Thus:

$$\int_o^{T_2} T_1 \cdot V_{Ref} \, dt = E_{dc} \cdot T_1 \text{ and } T_1 \cdot V_{Ref} \cdot T_2$$
$$= i \, E_{dc} \cdot T_1 \text{ and } T_2 = \frac{E_{dc}}{V_{Ref}}$$

Thus the counter 34 which is driven by reference oscillator 35 during the period $T_2$ will be proportional to $E_{dc}$ and this value is shown by display 36.

Figure 8:
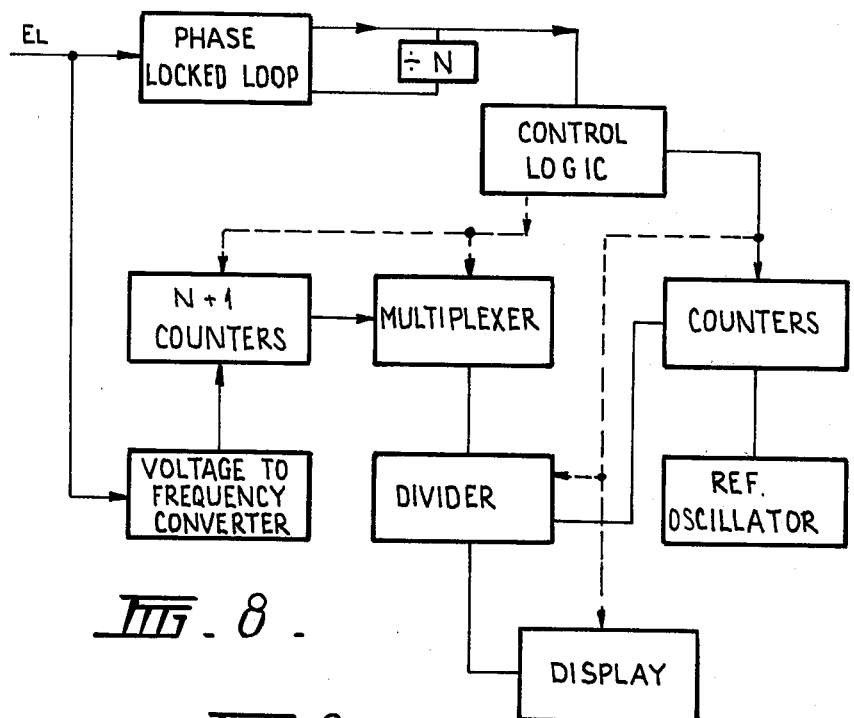
Figure 9:
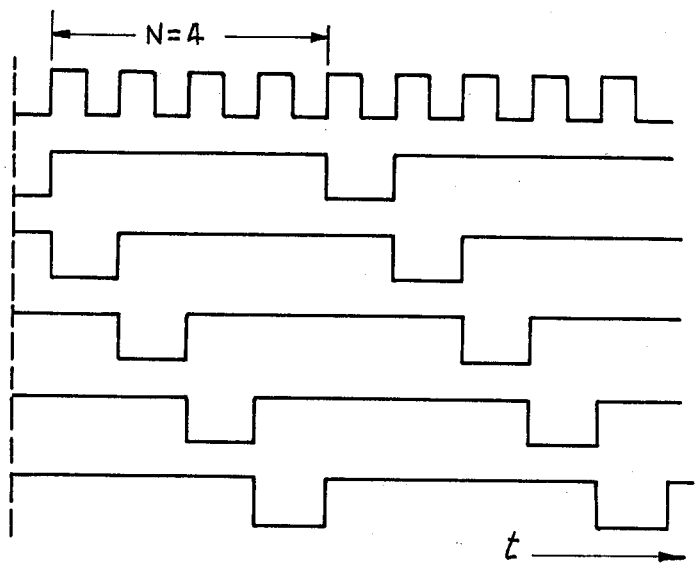

The circuit of Fig. 8, integrates by the digital fast response method involving multiple time overlapping digital integrations arranged to generate a running average of the $E_{out}$ signal. The average is taken over the period as determined by the phase locked loop. The time sequencing of the clock pulses and the integrating counters is shown in Fig. 9, and the operation of the circuit will be clear to the skilled reader.

The specific electronics necessary to practically implement each of the above embodiments will be obvious to a skilled person. Each block represent cially available package with or without modifications obvious to a skilled person in the light of the desired performance.

It will be appreciated that circuitry performing other methods of integration and division may be used depending on the purpose and the response required. For example, the hardware used in the embodiment of FIGS. 1 to 3 may be replaced by a microprocessor executing a software programme of the integration and division functions. The invention is not in any way restricted to the processing of signals from teeming crane weighing systems and is equally applicable to any situation in which it is desired to remove unwanted random cyclic noise from a d.c. signal.

We claim:

1. A signal processing circuit for removing unwanted cyclic and/or random components from a composite d.c./cyclic signal, said circuit comprising means for connecting a source of said composite signal to:
   a. means for determining the period of the signal; and
   b. means for integrating said signal over its period; and means joined to the period determining means and to the integrating means for dividing the integrated composite signal by the period thereof to produce the average of the composite signal over one period.

2. The circuit of claim 1, wherein the means for determining the period of the signal comprises a phase locked loop frequency discriminator.

3. The circuit of claim 2, wherein said connecting means includes a low pass filter interposed between the signal source and both the frequency discriminator and the integrating means; wherein said integrating means comprises a voltage to frequency converter connected to an output of the filter and a digital integrator circuit joined to said converter, said integrator being connected to an output of the frequency discriminator; and wherein said dividing means comprises a digital divider circuit joined to the integrating means via an output of the integrator circuit and joined to the period determining means via an output of a time-base integrator connected to said output of the frequency discriminator for producing a digital average signal; and a digital to analogue converter connected to said divider circuit for converting the digital average signal to analogue form.

4. The circuit of claim 1, wherein said source comprises a load cell output in a crane weighing system.

5. The circuit of claim 4, wherein said period determining means comprises a phase locked loop frequency discriminator; and wherein said integrating means comprises an integrator.

6. The circuit of claim 3, wherein said source comprises a load cell output in a crane weighing system.

7. The circuit of claim 2, wherein said integrating means comprises: an analogue integrator circuit which includes an integrator connected to said source, an integrator connected to a reference voltage source, and control logic connected to said integrators and to said frequency discriminator; and wherein said dividing means is connected to outputs of said integrators.

8. The circuit of claim 2, wherein said integrating means comprises a circuit joined to said source for integrating the signal by the dual slope integration method.

9. The circuit of claim 2, wherein said integrating means comprises a circuit joined to said source for integrating the signal by the digital fast response integration method.

* * * * *